J. G. MORITZ.
STEAMER.
APPLICATION FILED JUNE 7, 1910.
973,956.
Patented Oct. 25, 1910.
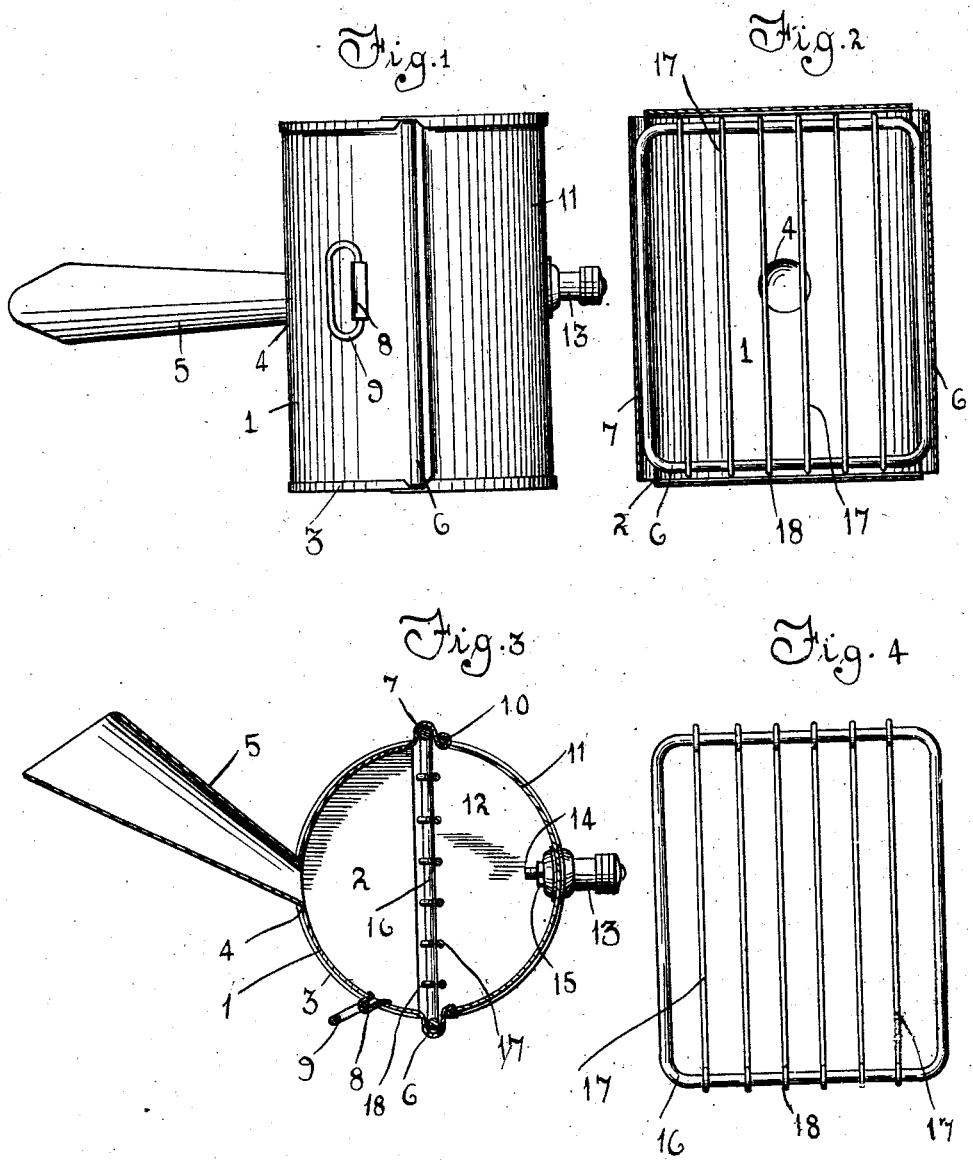
WITNESSES
Edwin Fry
K. H. Butler
INVENTOR
J. G. MORITZ
BY
Attorneys

UNITED STATES PATENT OFFICE.

JOHN GEORGE MORITZ, OF MILLERSBURG, OHIO.

STEAMER.

973,956.  Specification of Letters Patent.  Patented Oct. 25, 1910.

Application filed June 7, 1910. Serial No. 565,532.

*To all whom it may concern:*

Be it known that I, JOHN GEORGE MORITZ, a citizen of the United States of America, residing at Millersburg, in the county of Holmes and State of Ohio, have invented certain new and useful Improvements in Steamers, of which the following is a specification, reference being had therein to the accompanying drawing.

This invention relates to steamers, and the primary object of my invention is to provide a steaming device that can be easily attached to the spout of a kettle for steaming various kinds of bread, biscuits, and food-stuffs.

Another object of this invention is to provide a steamer that can be easily handled and maintained in a sanitary condition.

It is a well-known fact that hot water is often poured over food-stuffs to soften the same, but in the majority of instances the food-stuff is left in a wet and soggy condition. In devising the steamer I aim to obviate the necessity of using water for softening food-stuff, since it is only necessary to place the stuff within the steaming device, the device upon the spout of a kettle, and then the contents thereof will be sufficiently moistened and softened without necessarily making the same soggy and wet. The steamer constitutes a culinary utensil that is simple, durable, and inexpensive to manufacture.

With the above and such other objects in view as may hereinafter appear, the invention consists of the novel construction, combination, and arrangement of parts to be hereinafter specifically described and then claimed.

Reference will now be had to the drawing forming a part of this specification, wherein: Figure 1 is a plan of the steaming device. Fig. 2 is a horizontal sectional view of the same. Fig. 3 is a vertical longitudinal sectional view of the steamer, and Fig. 4 is a plan of a detached rack or frame adapted to form part of the steaming device.

To put my invention into practice, I provide a sectional drum with a spout adapted to convey steam thereto, and within the drum I mount a detachable rack or frame adapted to support food-stuff within the drum above the inner open end of the spout.

The reference numeral 1 denotes a semi-cylindrical section having closed ends 2, these closed ends being separate pieces flanged, as at 3, to engage the ends of the section 1, said flanges being secured thereto by solder or other fastening means. The section 1 approximately central thereof is provided with an opening 4 and secured in said opening is the small end of a funnel-shaped spout 5 adapted to be fitted over the spout of a kettle (not shown). The section 1 has the longitudinal edges thereof provided with integral guide-ways 6 and 7 and connected to said section adjacent to the guide-way 6 by a staple 8 is an eye or link 9 by which the steamer can be suspended from a nail or suitable support.

Hinged to the guide-way 7, as at 10, is a semi-cylindrical section 11 having end walls 12 similar to the end walls 2 of the section 1, the section 11 constituting a lid for the section 1. The section 11 intermediate the ends thereof is provided with a suitable knob or handle 13, preferably made of an insulating material secured to the section 11 by a bolt 14 and a nut 15. The insulating material prevents the hand from being burned when opening the section 11 while the steamer is in use.

Slidably mounted in the guide-ways 6 and 7 is a rectangular wire frame 16 having the ends thereof connected by a plurality of longitudinal parallel rods or wires 17, said rods or wires having the ends thereof bent, as at 18, to engage the ends of the frame 16. The frame 16 and the wires or rods 17 constitute a rack for supporting food-stuff, as a slice of bread within the drum above the open end of the funnel-shaped spout 5, whereby steam entering the drum will surround the food-stuff and render the same pliable, moist, or soft according to the stuff to be steamed within the device.

It is thought that the utility of the steaming device will be apparent without further description, and while in the drawings there is illustrated a preferred embodiment of the invention, it is to be understood that the steamer can be made of various sizes and various kinds of material without departing from the scope of the appended claims.

What I claim, is:

1. A steamer embodying semi-cylindrical sections hinged together and having closed ends, a funnel in communication with one of said sections, a rack interposed between said sections, and a handle carried by the other of said sections.

2. A steamer embodying a semi-cylindrical section having closed ends, a funnel-shaped spout in communication with said section, said section having the longitudinal edges thereof provided with guide-ways, a rack slidably mounted in said guide-ways, another semi-cylindrical section hinged to one of said guide-ways and having closed ends, and a handle carried by said section.

In testimony whereof I affix my signature in the presence of two witnesses.

JOHN GEORGE MORITZ.

Witnesses:
D. T. SIMPSON,
W. STILWELL.